000
United States Patent [19]
Buford

[11] 3,887,687
[45] June 3, 1975

[54] RECOVERY OF BORON FROM A POLYMER MATRIX
[75] Inventor: John T. Buford, Joplin, Mo.
[73] Assignee: The United States of America as represented by the United States Energy Research and Development Administration, Washington, D.C.
[22] Filed: Sept. 14, 1973
[21] Appl. No.: 397,463

[52] U.S. Cl. .................................. 423/292; 423/298
[51] Int. Cl. ......................... C01b 9/00; C01b 35/00
[58] Field of Search ................ 75/62; 423/298, 292

[56] References Cited
UNITED STATES PATENTS
2,997,370   8/1961   Irani.................................... 423/292
3,148,030   9/1964   May..................................... 423/292

*Primary Examiner*—L. Dewayne Rutledge
*Assistant Examiner*—Arthur J. Steiner
*Attorney, Agent, or Firm*—John A. Horan; David S. Zachry; Irving Barrack

[57] ABSTRACT

A method is provided for recovering boron dissolved or dispersed in a polymeric matrix which comprises heating the matrix to a temperature in the range 500° to 800° C. in an inert atmosphere for a time sufficient to effect thermal dissociation of the polymer, reacting the thermally dissociated residue with a halogenating reagent selected from the group consisting of $Cl_2$ or $Br_2$ at a temperature in the range 500° to 800° C., and then distilling the halogenation reaction product to obtain a purified $BCl_3$ or $BBr_3$ fraction.

6 Claims, 1 Drawing Figure

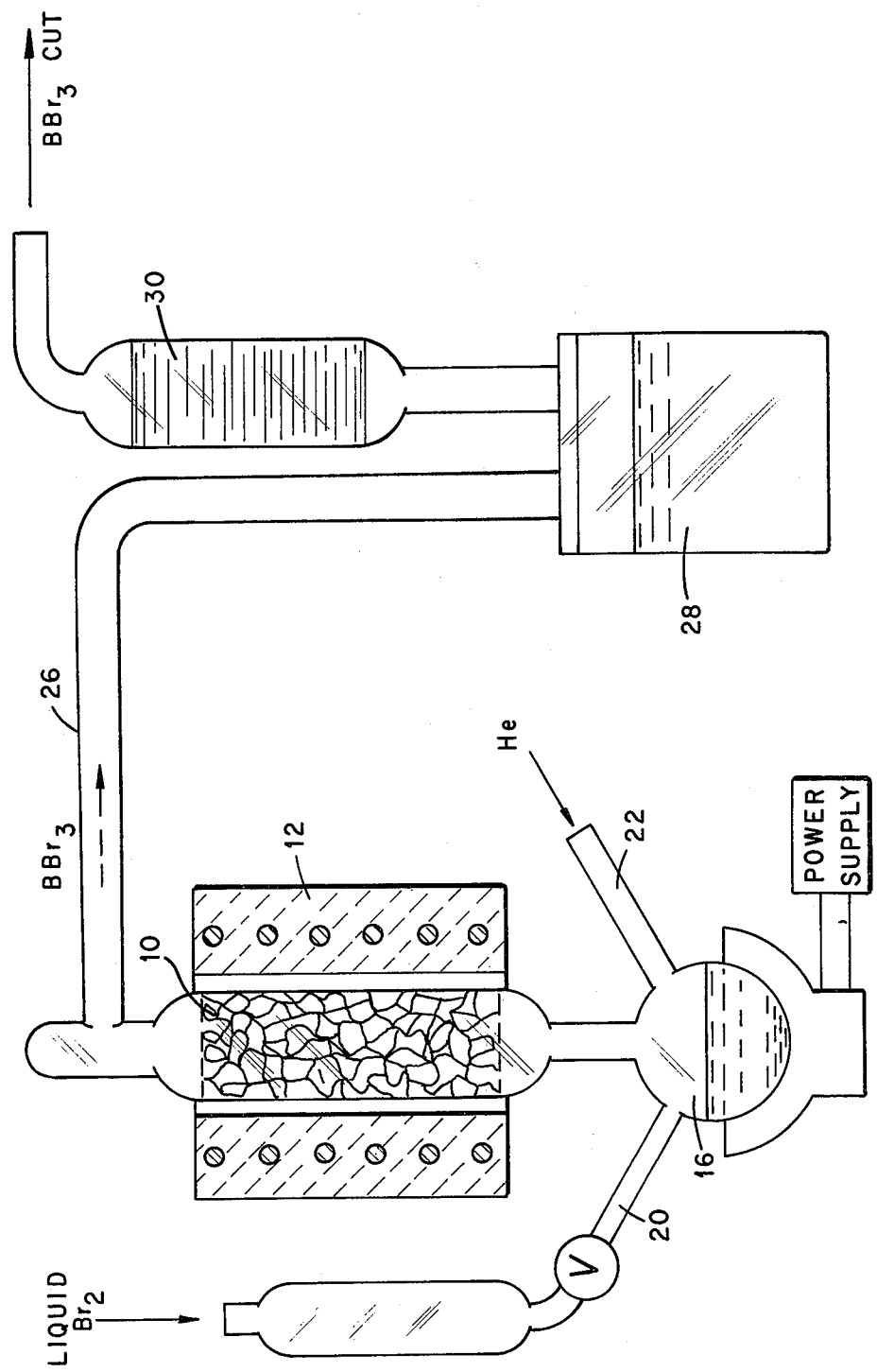

RECOVERY OF BORON FROM A POLYMER MATRIX

BACKGROUND OF THE INVENTION

The present invention relates to a method for the recovery of boron from a polymer matrix. It was made in the course of, or under, a contract with the U.S Atomic Energy Commission.

The neutron capture properties of boron-10 have resulted in employing this isotope as a control rod, as a burnable poison, and as a neutron shielding material. One useful form of neutron shielding material comprises a dispersion of boron metal within a matrix of an organic polymer such as neoprene or a silicone elastomer. This provides a lightweight polymer with high boron density containing carbon and hydrogen which can act as moderators while the boron serves both as a neutron moderator and a neutron absorber. Moreover, since the matrix material is a polymer it can be readily formed into various shapes and configurations by standard polymer forming and shaping techniques. Such boron-containing polymers have a limited useful life due to the destructive effects of neutron irradiation on the polymer matrix and must be replaced by fresh unirradiated material. The irradiated polymer would normally be discardable, but it still contains useful amounts of boron-10 which would be reusable if its recovery could be economically accomplished with high yield. Another source of potentially retrievable boron comes from the scrap generated during the fabrication of the boron-loaded polymer. An economical process for recovering boron from such polymer sources would be one in which the boron could be recovered in high yield and in which the recovered boron is in elemental form and preferably in a form which can be readily converted to elemental crystalline as opposed to amorphous boron.

It is accordingly a principal object of this invention to provide a boron recovery process of the character described.

Another object is to provide a process for separating boron from a polymeric matrix.

A further object is to separate boron existing as a dispersion in a neutron-irradiated polymer matrix.

The polymer matrix material from which boron is recoverable in accordance with the herein-disclosed process includes but is not limited to such polymers or elastomers based on neoprene, chloroprene, silicones, and silicone rubbers of sufficiently high molecular weight and structure that they can be fabricated by standard polymer fabrication techniques such as molding, extrusion, or calendering.

DETAILED SUMMARY OF THE INVENTION

The process of this invention comprises heating a boron-containing polymer in a non-oxidizing unreactive atmosphere at a temperature sufficient to effect thermal dissociation of the polymer, reacting the thermally dissociated residue with gaseous bromine or chlorine at a temperature of at least 800°C., and then distilling the resultant gaseous reaction product to recover BBr$_3$.

The reaction which I term thermal dissociation is designed to produce a reaction by-product from which the boron can be quantitatively converted to either boron trichloride or boron tribromide. To accomplish this I find that the boron-containing polymer must be heated to a temperature of at least 500°C. and to a maximum upper temperature of 800°C. in a non-oxidizing unreactive atmosphere using a cover gas such as argon or helium during thermal dissociation. Temperatures below 500°C. result in incomplete thermal dissociation and temperatures above 800°C. provide no practical advantage in terms of producing a reaction by-product which can be readily quantitatively chlorinated or brominated.

The time at temperature for the thermal dissociation is a function of the mass of charge and the end point can be determined visually. The halogenation process completion can be determined by (1) the reduction in temperature due to a decrease in the exothermic reaction of the halide and boron and (2) the visual evidence of excessive free bromine.

Oxygen should be avoided because it leads to formation of $B_2O_3$, a form of boron which, under the conditions of this process, is difficult to convert quantitatively to the desired boron halide. Nitrogen is a non-preferred cover gas because of the possibility of formation of boron nitrides or carbonitrides—forms of boron which may lead to incomplete conversion of boron to the desired halide.

The halogenation reaction is exothermic and virtually self sustaining as soon as a boron-containing scrap charge reaches a temperature of about 600°C. Generally, it is preferred to operate at 800°C. where maximum controllable reaction occurs. The halogenated reaction product is collected in a vessel and distilled until a purified fraction of BBr$_3$ or BCl$_3$ is collected. A purified BBr$_3$ cut is collected at about 90°C., while a purified, clear-liquid BCl$_3$ cut is collected at a temperature of about −40°C.

The purified BBr$_3$ or BCl$_3$ cuts are then easily converted to crystalline boron metal by known techniques. For example, Kroll reduction of the trichloride with molten sodium, potassium, or aluminum has been found to be a practical conversion; see the *Encyclopedia of Chemical Technology*, Kirk and Othmer, Vol. 3, p. 603, 1964. A crystal bar technique involving dissociation of boron tribromide on a heated tungsten wire will produce boron of exceptionally high purity as described in "High Purity Boron," Buford and Starks, *Electrochemical Technology*, Vol. I, pp. 108–111 (1963).

Of the two effective halogenating reagents used in the hereindescribed process Br$_2$ is preferred because of greater ease in handling and storing BBr$_3$ which is liquid at room temperature while BCl$_3$ is a gas at the same temperature. F$_2$ is an effective halogenator, but its use involves complications since it prevents use of glass equipment and because BF$_3$ cannot be easily converted to elemental boron. Iodine is also a non-preferred halogenator because its rate of reaction with the thermally dissociated product is low and the BI$_3$ intermediate converts to B in low yields.

A typical mode of practicing the invention can be understood by referring to the FIGURE, which shows apparatus for conducting the thermal dissociation and conversion to the preferred BBr$_3$. As shown, an elongated, vertically oriented chamber 10 is charged with a load of crushed particles up to 4 inches square of a boron-loaded polymer or elastomer of the character described. The charge is supported by a porous ledge 14 and covered with a similar porous material 14' to prevent particulates from passing out of chamber 10. The chamber 10 extends downwardly beyond the porous ledge to a necked portion connecting with a flask 16 supplied with liquid bromine from a reservoir 18 feeding the flask through line 20. An electrical heating blanket 24 is energized at the appropriate time to convert liquid $B_2$ to gaseous form. Flask 16 is provided with a side arm 22 through which an inert gas can flow to sweep out the system of oxygen and water vapor and prevent conversion of B to $B_2O_3$. The upper portion of chamber 10 extends beyond porous cover 14' to a necked portion which is connected to line 26 feeding into collecting container 28. Collecting container 28 serves as a receiver for gaseous and liquid reaction products of the thermal dissociation reaction. The products are heated in chamber 28 and distilled into a distillation column 30 connected to chamber 28 in order to collect a purified $BBr_3$ cut. An Aldershaw 30 plate distillation will be effective for this purpose.

In practice, a given charge of boron-loaded scrap polymer is charged into chamber 10. The electrical furnace 12 is energized and helium gas is swept through the system to remove oxygen and sorbed water vapor. A temperature of 600°–800°C. is maintained in the chamber until thermal dissociation has occured, whereupon liquid bromine is fed from reservoir 18 into flask 16 where it is heated to its boiling point and swept through the system as a mixture of the helium and gaseous bromine. Gaseous bromination products are carried into collecting container 28 where they are heated to effect distillation in column 30 in order to collect a purified $BBr_3$ product.

The following is a materials balance of a boron-containing neoprene charge treated in accordance with the foregoing procedure:

| | |
|---|---|
| Charge: Granulated Neoprene | 24,320.0 grams |
| Boron Content by Random Sampling | 59.5% |
| After Pretreat (Organic Dissociation) | 19,957.0 grams |
| Organic Collected 1660 at 0.1%, or | 1.66 grams B Boron |
| $BBr_3$ Collected 341,400 grams at 4.04% B = | 13,792.6 grams |
| Organic Collected | 1.6 grams |
| Organic Scrub $H_2O$ | 2.8 grams |
| Bromination and Distillation Scrub $H_2O$ | 39.0 grams |
| Bromination Units Wash $H_2O$ | 217.6 grams |
| Bromination Residues | 46.2 grams |
| Bromination Residues Wash $H_2O$ | 28.4 grams |
| Distillation Solids | 135.7 grams |
| Distillation Solids Wash $H_2O$ | 168.2 grams |
| | 14,432.1 grams |
| Direct Recovery as $BBr_3$ 13,792.6/14,432.1 = | 95.56% |
| Purity of Boron | 99.5% |

What is claimed is:

1. A method for recovering boron dissolved or dispersed in a polymeric or elastomeric matrix which comprises heating the matrix to a temperature in the range 500° to 800° C. in an inert atmosphere for a time sufficient to effect thermal dissociation of the polymer, reacting the thermally dissociated residue with a halogenating reagent selected from the group consisting of $Cl_2$ or $Br_2$ at a temperature in the range 500° to 800° C., and then distilling the halogenation reaction product to obtain a purified $BCl_3$ or $BBr_3$ fraction.

2. The method according to claim 1 in which the polymer is neoprene.

3. The method according to claim 1 in which the polymer is chloroprene.

4. The method according to claim 1 in which the polymer is silicone rubber.

5. The method according to claim 1 in which the polymer is silicone elastomer.

6. The method according to claim 1 in which the halogenating reagent is diluted with an inert gas.

* * * * *